(12) United States Patent
Ohta et al.

(10) Patent No.: US 6,990,805 B2
(45) Date of Patent: Jan. 31, 2006

(54) WASTE HEAT RECOVERY DEVICE FOR INTERNAL COMBUSTION ENGINE

(75) Inventors: Naoki Ohta, Wako (JP); Tsuneo Endoh, Wako (JP); Atsushi Baba, Wako (JP); Tsutomu Takahashi, Wako (JP); Masashi Shinohara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 279 days.

(21) Appl. No.: 10/149,582

(22) PCT Filed: Dec. 8, 2000

(86) PCT No.: PCT/JP00/08704

§ 371 (c)(1),
(2), (4) Date: Oct. 11, 2002

(87) PCT Pub. No.: WO01/44647

PCT Pub. Date: Jun. 21, 2001

(65) Prior Publication Data

US 2003/0056504 A1 Mar. 27, 2003

(30) Foreign Application Priority Data

Dec. 16, 1999 (JP) ............................................ 11-357687

(51) Int. Cl.
*F01N 3/02* (2006.01)

(52) U.S. Cl. ............................. 60/320; 60/298; 60/305; 60/321; 123/41.16; 123/41.76; 123/41.77; 137/340; 165/51

(58) Field of Classification Search .................. 60/298, 60/304, 305, 320, 321, 308; 123/41.16, 41.17, 123/41.76, 41.77, 41.79, 41.85, 188.9, 90.23, 123/90.37; 137/340; 165/47, 51
See application file for complete search history.

(56) References Cited

U.S. PATENT DOCUMENTS

| | | | | | |
|---|---|---|---|---|---|
| 4,169,488 | A | * | 10/1979 | Goloff et al. | 137/340 |
| 4,284,055 | A | * | 8/1981 | Wakeman | 123/556 |
| 4,450,798 | A | * | 5/1984 | Jessel | 123/41.41 |
| 5,404,844 | A | * | 4/1995 | Schchter | 123/90.12 |
| 5,987,885 | A | * | 11/1999 | Kizer et al. | 60/298 |
| 6,178,744 | B1 | * | 1/2001 | Perset | 60/288 |
| 6,340,013 | B1 | * | 1/2002 | Britton | 123/255 |

FOREIGN PATENT DOCUMENTS

JP 56-145407 A 12/1981

\* cited by examiner

*Primary Examiner*—Binh Q. Tran
(74) *Attorney, Agent, or Firm*—Birch, Stewart, Kolasch & Birch, LLP

(57) ABSTRACT

A waste heat recovering device for an internal combustion engine includes: an internal combustion engine; and an evaporator into which an exhaust gas of the internal combustion engine is introduced as a high temperature fluid. An exhaust gas inlet of the evaporator is placed adjacent to an exhaust valve of the internal combustion engine. Thus, there can be provided a waste heat recovering device having a high waste heat recovery rate.

18 Claims, 6 Drawing Sheets

WASTE HEAT RECOVERY DEVICE FOR INTERNAL COMBUSTION ENGINE

This application is the national phase under 35 U.S.C. §371 of PCT International Application No. PCT/JP00/08704 which has an International filing date of Dec. 8, 2000, which designated the United States of America.

FIELD OF THE INVENTION

The present invention relates to a waste heat recovering device for an internal combustion engine, and more particularly to a waste heat recovering device including an internal combustion engine and a heat exchanger into which an exhaust gas of the internal combustion engine is introduced as a high temperature fluid.

BACKGROUND ART

In a device of this type, a heat exchanger has been provided on an exhaust gas outlet side of an exhaust port (see, for example, Japanese Patent Application Laid-open No. 56-156407).

However, the conventional device has a problem that a waste heat recovery rate is low since heat of an exhaust gas is transferred to a cylinder head side between an exhaust gas inlet side and the outlet side of the exhaust port to reduce temperature of the exhaust gas.

DISCLOSURE OF THE INVENTION

The present invention has an object to provide a waste heat recovering device in which transfer of heat of an exhaust gas to a cylinder head side is minimized to allow increase in a waste heat recovery rate.

To attain the above described object, the present invention provides a waste heat recovering device for an internal combustion engine, including: an internal combustion engine; and a heat exchanger into which an exhaust gas of the internal combustion engine is introduced as a high temperature fluid, wherein an exhaust gas inlet of the heat exchanger is placed adjacent to an exhaust valve of the internal combustion engine.

With the above arrangement, the exhaust gas from a combustion chamber can be introduced into the heat exchanger immediately after passing through a valve seat and used as the high temperature fluid, thereby allowing transfer of heat of the exhaust gas to the cylinder head side to be minimized, that is, allowing reduction in heat loss of the exhaust gas and increase in a waste heat recovery rate.

BEST MODE FOR CARRYING OUT THE INVENTION

Figure 1:
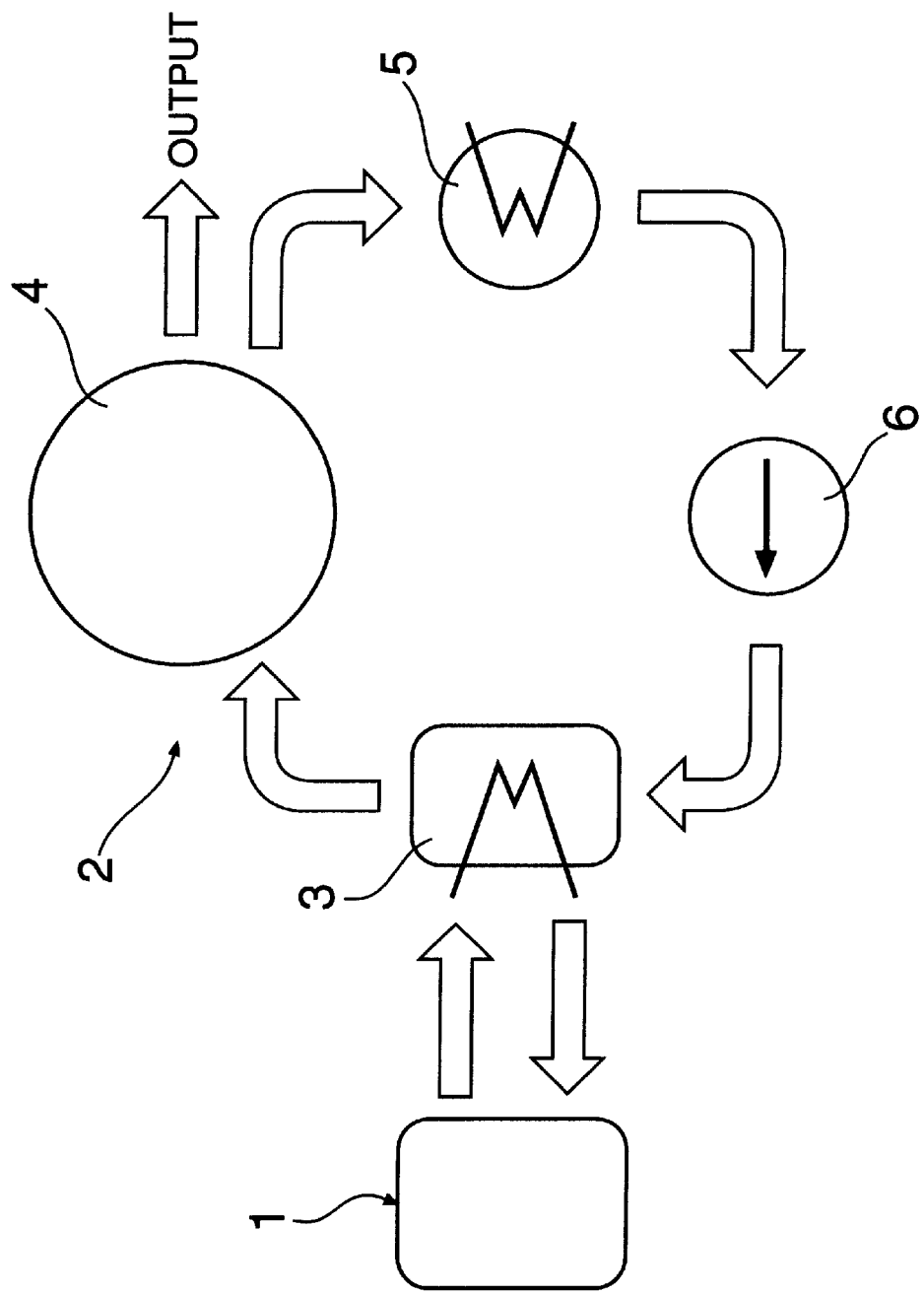
FIG. 1 is a schematic view of a waste heat recovering device for an internal combustion engine.

In FIG. 1, a waste heat recovering device 2 of an internal combustion engine 1 comprises an evaporator 3 as a heat exchanger into which waste heat of the internal combustion engine 1, for example, an exhaust gas in the form of a high temperature fluid is introduced as a heat source and generates vapor with a raised temperature and a raised pressure, that is, a raised temperature/pressure vapor; an expander 4 for producing output by expansion of the raised temperature/pressure vapor; a condenser machine 5 for liquefying the vapor, which is exhausted from the expander 4, with a dropped temperature and a dropped pressure after the expansion, that is, a dropped temperature/pressure vapor; and a supply pump 6 for supplying liquid, for example, water, from the condenser 5 to the evaporator 3.

Figure 2:
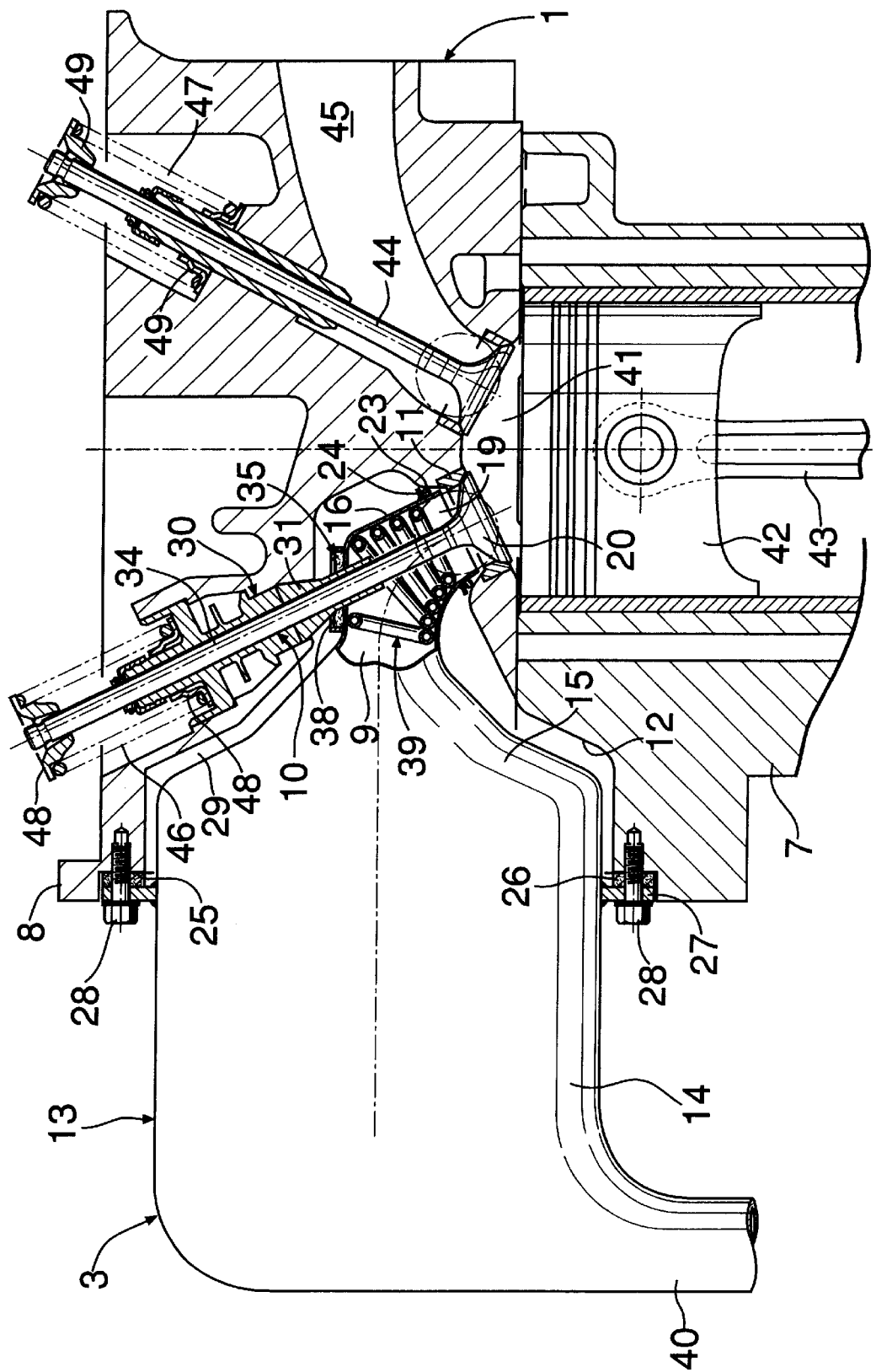
FIG. 2 is a front view in vertical section of an example of a relationship among an evaporator, a cylinder head and a cylinder block.

In FIG. 2, the internal combustion engine 1 has a cylinder block 7 and a cylinder head 8 mounted to the cylinder block 7.

The evaporator 3 is mounted to the cylinder head 8 and the cylinder block 7 so as to form an exhaust port 9 and form a part of an exhaust pipe. Specifically, over a portion corresponding to the exhaust port, of the cylinder head 8, and a part of the cylinder block 7, a relatively large cavity 12 is formed for extending from a valve seat 11 of an exhaust valve 10 to both outer side surfaces of the cylinder head 8 and the cylinder block 7, and some parts of a cylindrical housing 13 of the evaporator 3, that is, a part of a large diameter cylinder portion 14, a tapered cylinder portion 15 extending from one end of the large diameter cylinder portion 14, and a small diameter cylinder portion 16 extending in a bent manner from the tapered cylinder portion 15 are provided in the cavity 12 with predetermined clearance from an inner surface of the cavity 12. The cylindrical housing 13 is made of stainless steel.

Figure 3:
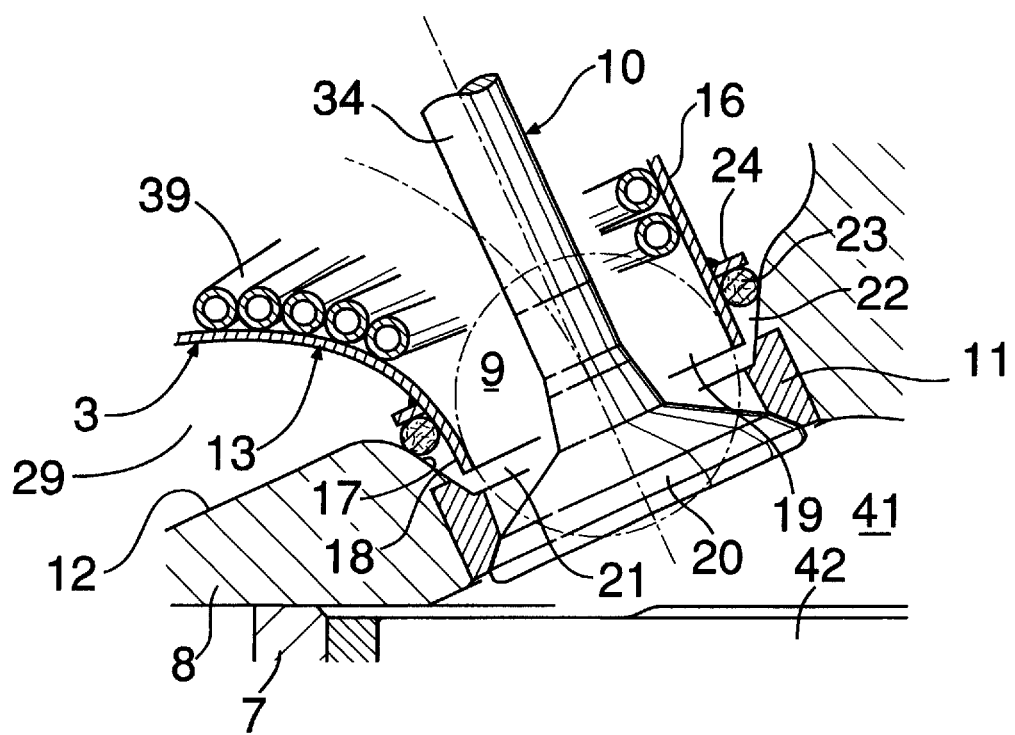
FIG. 3 is an enlarged view of essential portions in FIG. 2.

As is clearly shown in FIG. 3, the cavity 12 forms a tapered hole 17, near the valve seat 11, with a small diameter portion thereof placed toward the valve seat 11, a tip 18 of the small diameter cylinder portion 16 in the cylindrical housing 13 enters the tapered hole 17 to place an exhaust gas inlet 19 adjacent to a valve head 20 of the exhaust valve 10 and the valve seat 11, and a gap 21 is provided between an end surface of the exhaust gas inlet 19 and an end surface of the valve seat 11 opposite therefrom. To seal a cylindrical clearance 22 with a wedged section which exists between the tapered hole 17 and the tip 18, an annular seal member 23 is mounted to an outer peripheral surface of the tip 18, and the tip 18 is provided with a flange 24 holding the annular seal member 23 in the cylindrical clearance 22. As the annular seal member 23, an annular member including ceramic fibers (long or short fibers) and having elasticity is used, but carbon based annular molds or metal bellows may be used.

In FIG. 2, an annular stepped 25 is formed at an opening edge of the cavity 12 over both outer side surfaces of the cylinder block 7 and the cylinder head 8, and a mounting flange 27 provided on an outer peripheral surface of an intermediate portion of the large diameter cylinder portion 14 is loosely fitted into the recess 25 via an annular plate seal member 26. After positioning the cylindrical housing 13, the mounting flange 27 is mounted to the cylinder block 7 and the cylinder head 8 with a plurality of volts 28. Thus, a closed insulating layer 29 of air is formed between outer peripheral surfaces of a part of the large diameter cylinder portion 14, tapered cylinder portion 15 and small diameter cylinder portion 16, and the inner surface of the cavity 12. As the annular plate seal member 26, an annular plate including ceramic fibers (long or short fibers) and having elasticity is used, but carbon based annular plate molds or metal bellows may be used.

Figure 4:
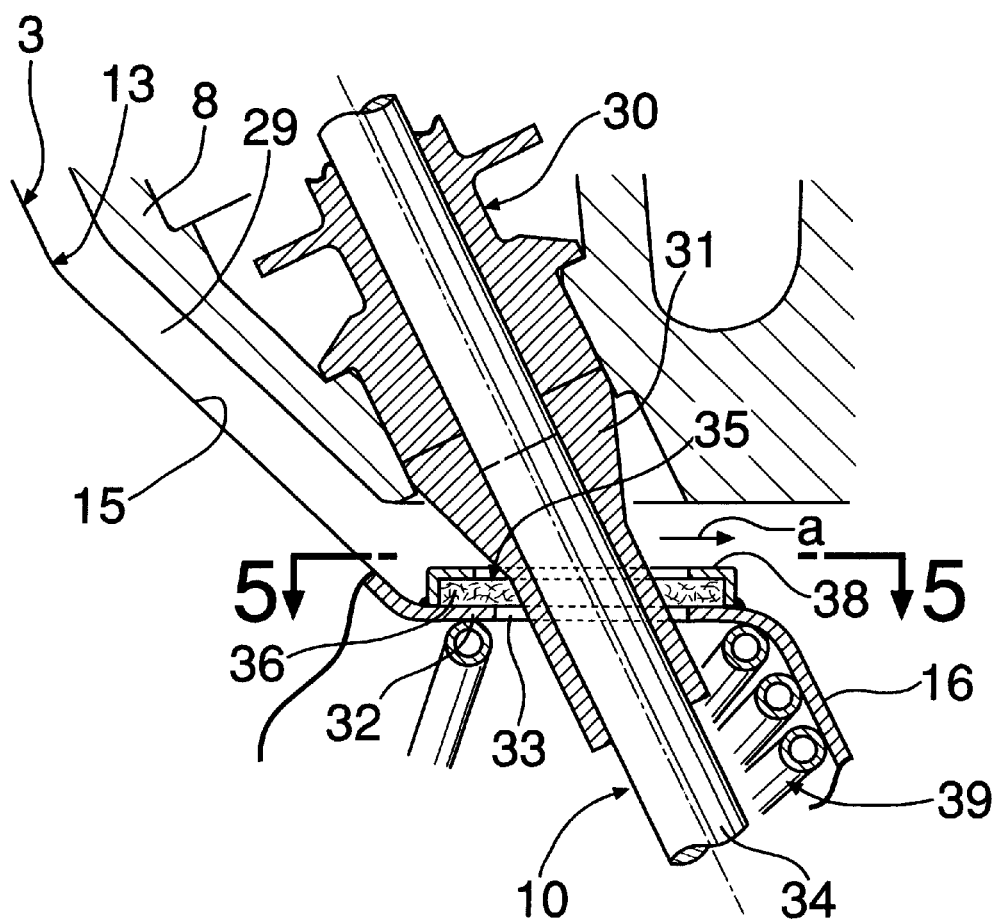
FIG. 4 is another enlarged view of essential portions in FIG. 2.

As is clearly shown in FIG. 4, a valve stem guide 30 of the exhaust valve 10 is mounted to the cylinder head 8, and a lower cylinder 31 thereof extends into the small diameter cylinder portion 16 through an insert hole 33 formed in a flat portion 32 of the small diameter cylinder portion 16. A valve stem 34 of the exhaust valve 10 is inserted into the small diameter cylinder portion 16 from the exhaust gas inlet 19 of the small diameter cylinder portion 16, and slidably fitted into the valve stem guide 30.

Figure 5:
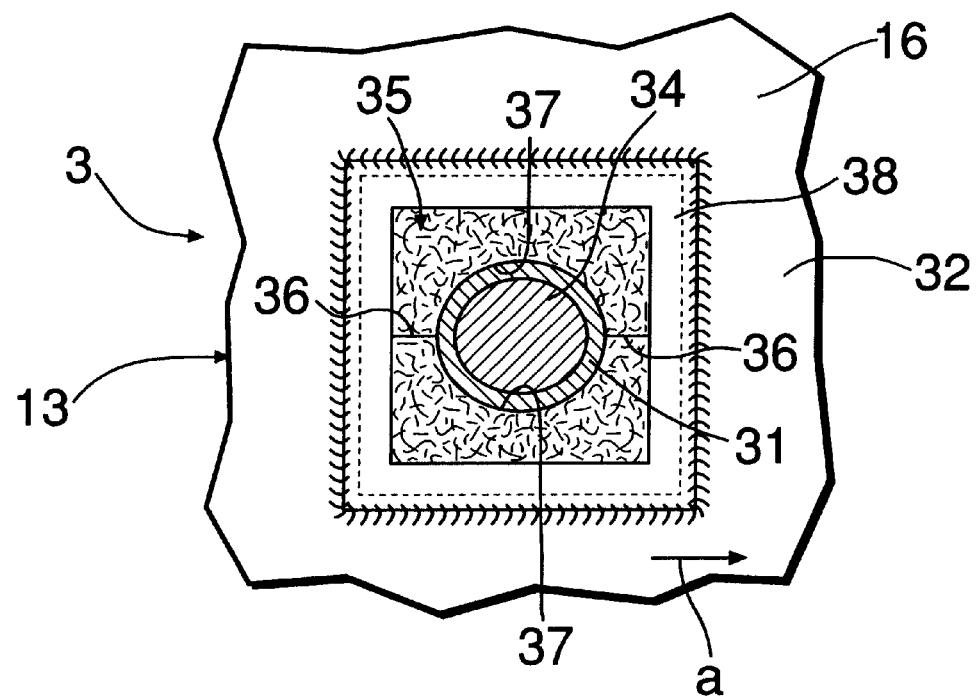
FIG. 5 is a sectional view taken along a line 5—5 in FIG. 4.

A seal structure between the insert hole 33 of the small diameter cylinder portion 16 and the lower cylinder 31 of the valve stem guide 30 is as described below. Specifically, as shown in FIG. 5, a two-divided flat seal member 35 having elasticity is placed on the flat portion 32 with a recess 37 opening into mating faces 36 matched to an outer peripheral surface of the lower cylinder 31 and with the mating faces 36 matched to each other. In this case, the mating faces 36 are placed parallel to an extended direction a by expansion of the small diameter cylinder portion 16. A frame-shaped holder 38 is welded to the flat portion 32 with the seal member 35 compressed. As the flat seal member 35, a flat plate including ceramic fibers (long or short fibers) and having elasticity is used, but carbon based flat molds or the like may be used.

In the evaporator 3, coiled conduits 39 are provided in the large diameter cylinder portion 14, tapered cylinder portion 15, and small diameter cylinder portion 16, and the conduits 39 pass supplied water and the raised temperature/pressure vapor generated from the water. A small diameter pipe 40 extending from the other end of the large diameter cylinder portion 14 is connected to the exhaust pipe.

In FIG. 2, reference numeral 41 denotes a combustion chamber; 42, piston; 43, connecting rod; 44, intake valve; 45, intake port; 46, 47, valve spring; 48, 49, valve spring retainers.

Configured as described above, an exhaust gas from the combustion chamber 41 can be introduced into the evaporator 3 immediately after passing through the valve seat 11 to be used as a high temperature fluid, thereby allowing transfer of heat of the exhaust gas to the cylinder head 8 side to be minimized and allowing increase in a waste heat recovery rate.

When heating of the evaporator 3 causes the small diameter cylinder portion 16 to be extended by expansion, in FIG. 3, the annular seal member 23 is pressurize to be pushed into the cylindrical clearance 22 with the wedged section by the flange 24, thereby enhancing sealing performance of the cylindrical clearance 22. In this case, the gap 21 between the exhaust gas inlet 19 and valve seat 11 prevents interference between the small diameter cylinder portion 16 and valve seat 11.

In an inserting portion of the lower cylinder 31 of the valve stem guide 30 in FIG. 4, the flat seal member 35 making close contact with the fixed lower cylinder 31 is elastically deformed to follow the extension of the small diameter portion cylinder 16. In this case, the seal member 35 has high elastic deformability since the mating faces 36 are placed parallel to the extended direction a, and the seal member 35 is held with compressed by the holder 38, thereby surely keeping seals between the mating faces 36, between the recess 37 and lower cylinder 31, and between the seal member 35 and flat portion 32 even during the elastic deformation.

The cavity 12 may be filled with insulating materials in order to increase insulating effect of the insulating layer 29, and in that case, filing the cavity 12 with powdery insulating materials comprising nm-size particles is effective means. As the powdery insulating materials, for example, a mixture of 66% by weight $SiO_2$ powder having an average particle size of 7 nm (manufactured by Nippon Aerosil Co., Ltd., Trade name: Fumed Silica) and 34% by weight $TiO_2$ powder having an average particle size of 15 nm (Tayca Corporation, Trade name: MT-150W) is used.

Figure 6:
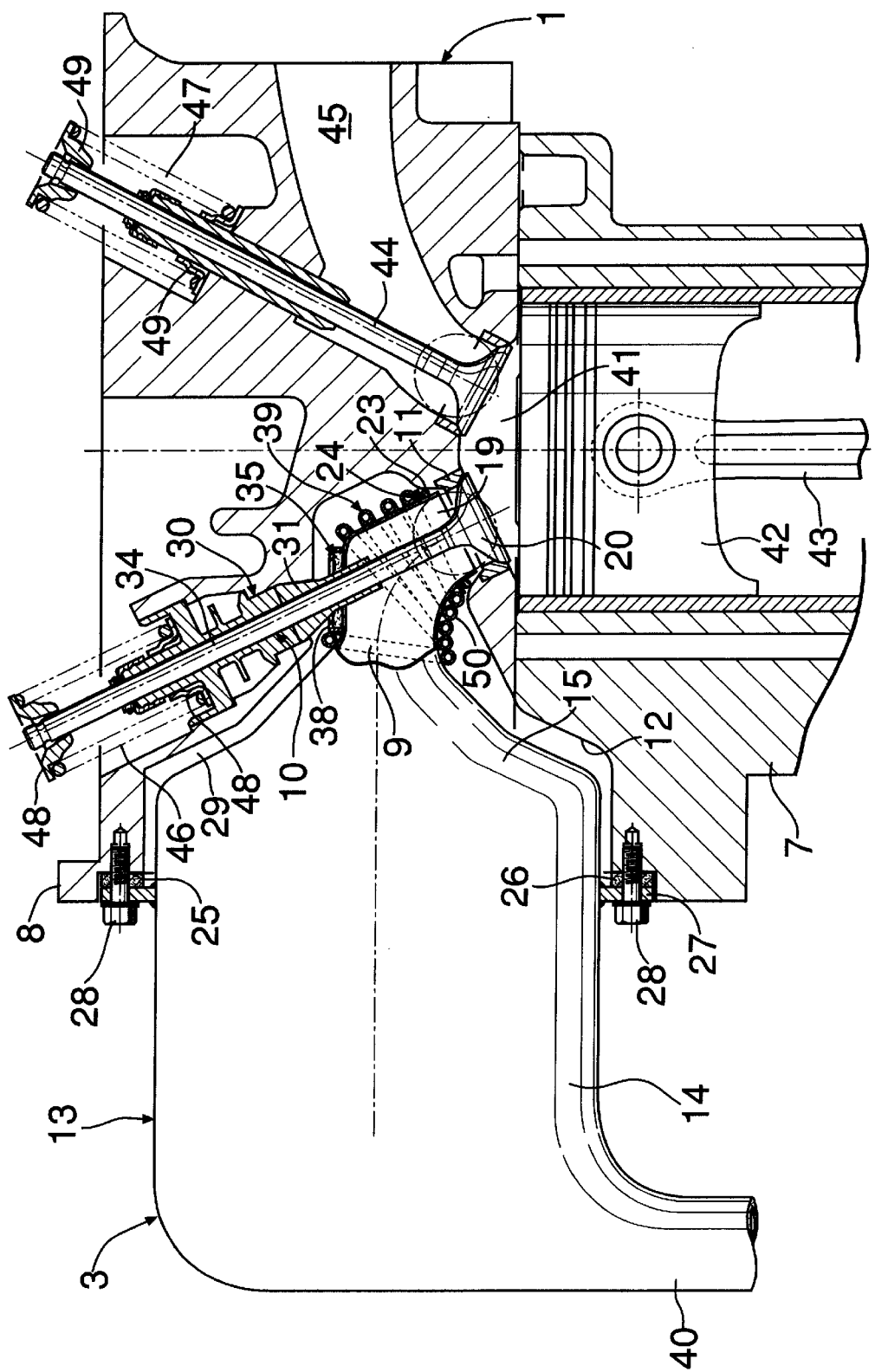
FIG. 6 is a front view in vertical section of another example of a relationship among the evaporator, the cylinder head and the cylinder block and corresponds to FIG. 2.

FIG. 6 shows another embodiment, and in this embodiment, portions 50 belonging to a small diameter cylinder portion 16, among conduits 39 of an evaporator 3 are wound around an outer peripheral surface of the small diameter cylinder portion 16. Most remaining portions of the conduits 39 are placed in the tapered cylinder portion 15 and the large diameter cylinder portion 14.

The configuration as described above facilitates locating the portions 50 of the conduits 39 with respect to the small diameter cylinder portion 16 as compared to the case in FIG. 2. In this embodiment, other configurations are the same as in FIG. 2, thus like reference numerals denote like component parts in FIGS. 2 and 6.

The embodiments of FIGS. 2 and 6 may be used together, and in this case, waste heat on inner and outer peripheral sides of the small diameter cylinder portion 16 can be efficiently recovered, and especially, waste heat that cannot be recovered on the inner peripheral side of the small diameter cylinder portion 16 to become radiant heat on the outer peripheral side can be recovered, thereby allowing heat radiation from a cylinder head 8 or the like into atmosphere to be minimized and allowing further increase in a waste heat recovery rate.

What is claimed is:

1. A waste heat recovering device for an internal combustion engine, comprising:

an internal combustion engine having a combustion chamber, an exhaust pipe for guiding an exhaust gas from said combustion chamber after combustion, and an exhaust valve disposed between said combustion chamber and said exhaust pipe for opening and closing operations;

and a heat exchanger disposed in said exhaust pipe downstream of said exhaust valve into which heat exchanger said exhaust gas of the combustion chamber is introduced as a high temperature fluid via said exhaust valve, wherein an exhaust gas inlet of said heat exchanger is placed adjacent to said exhaust valve of said internal combustion engine, wherein said heat exchanger forms at least a part of said exhaust pipe.

2. The waste heat recovering device according to claim 1, wherein an insulating layer is provided surrounding said heat exchanger.

3. The waste heat recovery device according to claim 1, wherein the exhaust valve penetrates through a small diameter cylinder portion of the heat exchanger and passes through the exhaust gas inlet of the heat exchanger, wherein the small diameter cylinder portion of the heat exchanger expands into a tapered cylinder portion, which in turn expands into a large diameter cylinder portion.

4. The waste heat recovery device according to claim 3, wherein the small diameter cylinder portion projects in a bent manner from the tapered cylinder portion toward the valve seat.

5. The waste heat recovery device according to claim 3, wherein the heat exchanger is made of stainless steel.

6. The waste heat recovery device according to claim 3, wherein the small diameter cylinder portion and the tapered cylinder portion extending from the exhaust valve are surrounded by a cavity, the cavity separating the cylinder block and the cylinder head from the heat exchanger.

7. The waste heat recovery device according to claim 1, wherein conduits are provided within the heat exchanger for carrying supply water and raised temperature water vapor generated by the water.

8. The waste heat recovery device according to claim 7, wherein some of the conduits are disposed on an outer side of the small diameter cylinder portion of the heat exchanger.

9. The waste heat recovery device according to claim 3, wherein elastic seal members with mating faces are provided around the exhaust valve where exhaust valve penetrates through the small diameter cylinder portion, in order to form a seal between the small diameter cylinder portion and the exhaust valve.

10. The waste heat recovery device according to claim 1, wherein the exhaust gas inlet of said heat exchanger projects into a tapered hole surrounding said exhaust valve of said internal combustion engine, with a seal being provided between the tapered hole and the heat exchanger.

11. A waste heat recovering device for an internal combustion engine, comprising:

an internal combustion engine having a combustion chamber, an exhaust pipe for guiding an exhaust gas from said combustion chamber after combustion, and an exhaust valve disposed between said combustion chamber and said exhaust pipe for opening and closing operations;

and a heat exchanger disposed in said exhaust pipe downstream of said exhaust valve into which heat exchanger said exhaust gas of the combustion chamber is introduced as a high temperature fluid via said exhaust valve, wherein an exhaust gas inlet of said heat exchanger is placed adjacent to said exhaust valve of said internal combustion engine, and wherein the exhaust valve penetrates through a small diameter cylinder portion of the heat exchanger and passes through the exhaust gas inlet of the heat exchanger, wherein the small diameter cylinder portion of the heat exchanger expands into a tapered cylinder portion, which in turn expands into a large diameter cylinder portion.

12. The waste heat recovery device according to claim 11, wherein the small diameter cylinder portion projects in a bent manner from the tapered cylinder portion toward the valve seat.

13. The waste heat recovery device according to claim 11, wherein the heat exchanger is made of stainless steel.

14. The waste heat recovery device according to claim 11, wherein the small diameter cylinder portion and the tapered cylinder portion extending from the exhaust valve are surrounded by a cavity, the cavity separating the cylinder block and the cylinder head from the heat exchanger.

15. The waste heat recovery device according to claim 11, wherein elastic seal members with mating faces are provided around the exhaust valve where exhaust valve penetrates through the small diameter cylinder portion, in order to form a seal between the small diameter cylinder portion and the exhaust valve.

16. A waste heat recovering device for an internal combustion engine, comprising:

an internal combustion engine having a combustion chamber, an exhaust pipe for guiding an exhaust gas from said combustion chamber after combustion, and an exhaust valve disposed between said combustion chamber and said exhaust pipe for opening and closing operations;

and a heat exchanger disposed in said exhaust pipe downstream of said exhaust valve into which heat exchanger said exhaust gas of the combustion chamber is introduced as a high temperature fluid via said exhaust valve, wherein an exhaust gas inlet of said heat exchanger is placed adjacent to said exhaust valve of said internal combustion engine, and wherein conduits are provided within the heat exchanger for carrying supply water and raised temperature water vapor generated by the water.

17. The waste heat recovery device according to claim 16, wherein some of the conduits are disposed on an outer side of the small diameter cylinder portion of the heat exchanger.

18. A waste heat recovering device for an internal combustion engine, comprising:

an internal combustion engine having a combustion chamber, an exhaust pipe for guiding an exhaust gas from said combustion chamber after combustion, and an exhaust valve disposed between said combustion chamber and said exhaust pipe for opening and closing operations;

and a heat exchanger disposed in said exhaust pipe downstream of said exhaust valve into which heat exchanger said exhaust gas of the combustion chamber is introduced as a high temperature fluid via said exhaust valve, wherein an exhaust gas inlet of said heat exchanger is placed adjacent to said exhaust valve of said internal combustion engine, and wherein the exhaust gas inlet of said heat exchanger projects into a tapered hole surrounding said exhaust valve of said internal combustion engine, with a seal being provided between the tapered hole and the heat exchanger.

* * * * *